(12) United States Patent
Liang et al.

(10) Patent No.: US 10,691,804 B2
(45) Date of Patent: Jun. 23, 2020

(54) PASSWORD POWER SWITCH CIRCUIT AND ELECTRONIC DEVICE

(71) Applicant: Wistron Corporation, New Taipei (TW)

(72) Inventors: Chen-Yi Liang, New Taipei (TW); Chun-Kuan Liu, New Taipei (TW)

(73) Assignee: Wistron Corporation, New Taipei (TW)

(*) Notice: Subject to any disclaimer, the term of this patent is extended or adjusted under 35 U.S.C. 154(b) by 410 days.

(21) Appl. No.: 15/862,576

(22) Filed: Jan. 4, 2018

(65) Prior Publication Data

US 2019/0087579 A1 Mar. 21, 2019

(30) Foreign Application Priority Data

Sep. 20, 2017 (TW) .............................. 106132197 A

(51) Int. Cl.
| | |
|---|---|
| G06F 21/57 | (2013.01) |
| H02J 7/00 | (2006.01) |
| H02J 7/34 | (2006.01) |
| G06F 21/45 | (2013.01) |
| G01K 13/00 | (2006.01) |
| G06F 21/31 | (2013.01) |
| G06F 21/81 | (2013.01) |
| H05B 45/00 | (2020.01) |

(52) U.S. Cl.
CPC ........... *G06F 21/575* (2013.01); *G01K 13/00* (2013.01); *G06F 21/31* (2013.01); *G06F 21/45* (2013.01); *G06F 21/81* (2013.01); *H02J 7/0013* (2013.01); *G06F 2221/034* (2013.01); *H02J 7/345* (2013.01); *H05B 45/00* (2020.01)

(58) Field of Classification Search
None
See application file for complete search history.

(56) References Cited

U.S. PATENT DOCUMENTS

| | | | |
|---|---|---|---|
| 6,615,356 B1 * | 9/2003 | Byun | G06F 21/81 726/36 |
| 2011/0080257 A1 * | 4/2011 | Buckner | G06K 7/0008 340/5.8 |

* cited by examiner

*Primary Examiner* — Joseph P Hirl
*Assistant Examiner* — Hassan Saadoun
(74) *Attorney, Agent, or Firm* — Winston Hsu

(57) ABSTRACT

A password power switch circuit for an electronic device includes a thermal energy conversion circuit and a programmable control chip. The thermal energy conversion circuit is used for generating a plurality of sensing temperatures. The programmable control chip is coupled to the thermal energy conversion circuit for storing a password and generating a power-on signal to a central processing device of the electronic device according to a plurality of locations corresponding to the plurality of sensing temperatures and a plurality of locations corresponding to the password. The central processing device determines at least one operation associated with the electronic device according to the power-on signal.

20 Claims, 6 Drawing Sheets

PASSWORD POWER SWITCH CIRCUIT AND ELECTRONIC DEVICE

BACKGROUND OF THE INVENTION

1. Field of the Invention

The present invention relates to a password power switch circuit and electronic device, and more particularly to a password power switch circuit and electronic device using thermal energy as power source.

2. Description of the Prior Art

The traditional electronic device utilizes battery power or external power source to drive a power source switch circuit, so a user can turn on the electronic device through the power source switch circuit when the electronic device is shut down. Or, when the electronic device operates in an operating system, the electronic device performs operations such as system boot, turn on screen, turn off screen or display selections regarding system shut down and reboot according to user operations to the power source switch circuit (e.g., long or short press to the power source switch circuit). In addition, the manufacturer of the electronic device may design specific combination keys to the power source switch circuit with other keys to allow the user to shut down the electronic device forcibly.

However, currently the password protection function can be activated only when the electronic device is boot to operate in the operating system, which leads personal information security leakage to the user. For example, another person may hack the user password after the electronic device is boot to hack personal information. Or, when the electronic device is stolen, a thief can shut down the electronic device forcibly by combination keys to turnoff positioning tracking function of the electronic device.

Therefore, there is a need to provide a password power switch circuit with password protection function to replace the traditional power source key to prevent another person from shutting down or turning on the electronic device of the user.

SUMMARY OF THE INVENTION

It is therefore an objective of the present invention to provide a password power switch circuit and electronic device with password protection function.

The present invention discloses a password power switch circuit for an electronic device including a thermal energy conversion circuit configured to generate a plurality of sensing temperatures, and a programmable control chip coupled to the thermal energy conversion circuit, and configured to store a password and generate a power-on signal to a central processing device of the electronic device according to sensing positions corresponding to the plurality of sensing temperatures and positions corresponding to the password, wherein the central processing device determines an operation associated with the electronic device according to the power-on signal.

The present invention further discloses an electronic device including a password power switch circuit. The password power switch circuit includes a thermal energy conversion circuit and a central processing device. The thermal energy conversion circuit is configured to generate plurality of sensing temperature. The programmable control chip is coupled to the thermal energy conversion circuit, and configured to store a password and generate a power-on signal according to sensing positions corresponding to the plurality of sensing temperature and sensing positions corresponding to the password. The central processing device is coupled to the password power switch circuit, and configured to determine an operation associated with the electronic device according to the power-on signal.

The password power switch circuit of the present invention utilizes the thermal energy conversion circuit as the password input interface, and when the input password is correct, the thermal energy sensed by the thermal energy conversion circuit is used to perform thermal energy conversion to drive the password power switch circuit. As a result, different from the traditional power source switch circuit using battery or external power source as electricity power and without password protection function, the password power switch circuit of the present invention utilizes thermal energy conversion as the electricity power and has the password protection function.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
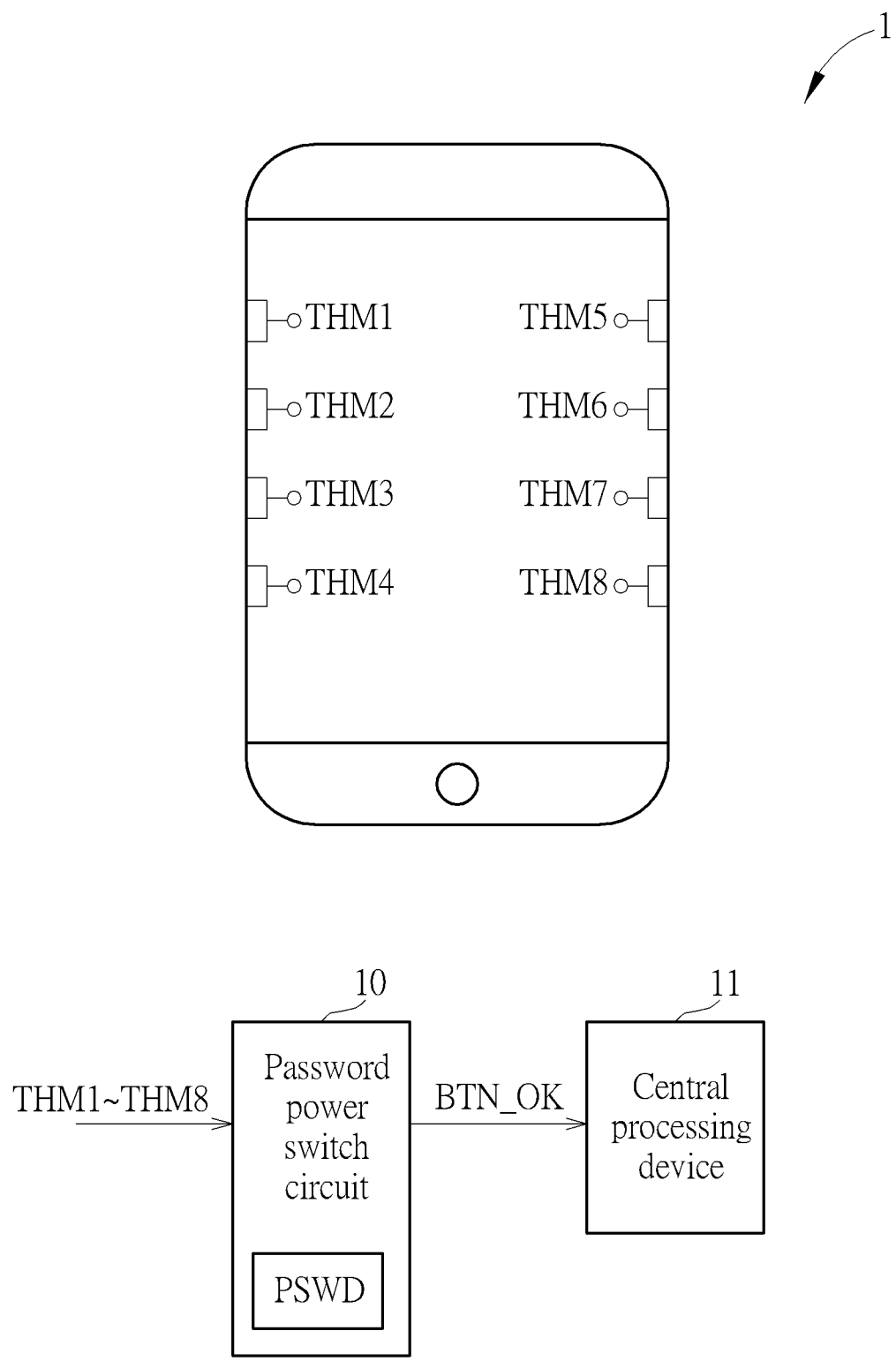
FIG. 1 is a schematic diagram of an electronic device according to an embodiment of the present invention.

FIG. 1 is a schematic diagram of an electronic device 1 according to an embodiment of the present invention. The electronic device 1 may be a smart phone, a tablet computer, a laptop computer, and so on. The electronic device 1 includes a password power switch circuit 10 and a central processing device 11, wherein password power switch circuit 10 includes a thermal energy conversion circuit. The password power switch circuit 10 is coupled to central processing device 11, and configured to generate a power-on signal BTN_OK to the central processing device 11 according to plurality of sensing temperature THM1-THM8 and a password PSWD, to indicate the following operation (e.g., system boot, turn on screen, turn off screen or display selections regarding system shut down and reboot).

The thermal energy conversion circuit is used for collecting thermal energy generated by human body and converting it into electricity. The thermal energy conversion circuit includes a plurality of temperature sensor for respectively generating the sensing temperatures THM1-THM8, and converting the thermal energy corresponding to the sensing temperature into electricity to generate electricity power to drive the password power switch circuit 10. As a result, the password power switch circuit 10 utilizes the thermal energy to be the source of electricity power instead of battery and external power source.

Noticeably, the thermal energy conversion circuit may be used as a password input interface, when fingers of a user touch the password power switch circuit 10, the sensing results of thermal energy conversion circuit and the password PSWD (which may be stored in internal memory of the 10) may be compared to determine whether an input password is correct or not. When the input password is correct, the password power switch circuit 10 is powered and operations such as system boot, turn on screen, turn off screen or display selections regarding system shut down and reboot can be performed; on the other hand, when the input password is incorrect, the password power switch circuit 10 cannot be powered to protect the electronic device 1 from turning on or shutting down by other person.

In detail, given that the password PSWD is "2, 3, 4" (e.g., sensing positions corresponding to the sensing temperatures THM2, THM3 and THM4). When the user touches the thermal energy conversion circuit 100 to generate the sensing temperatures THM2, THM3 and THM4 and the input password matches with the password PSWD, the thermal energy contained by the sensing temperatures THM2, THM3 and THM4 is utilized to perform thermal energy conversion to generate a drive current for driving the password power switch circuit 10. When the password power switch circuit 10 is powered, the power-on signal BTN_OK is generated to the central processing device 11, and the central processing device 11 determines the following operations (e.g., system boot, turn on screen, turn off screen or display selections regarding system shut down and reboot) according to the power-on signal BTN_OK. on the other hand, when the user touches the thermal energy conversion circuit 100 to generate sensing temperatures different from the password PSWD, the password power switch circuit 10 will not be powered, the power-on signal BTN_OK is not generated to the central processing device 11, and no operation is performed to protect the electronic device 1 from turning on or shutting down by other person.

Noticeably, the password PSWD may be arbitrary combinations of the sensing temperatures. In one embodiment, the password PSWD may be an ordered sequence "5-3-1", "2-2-6-8", and so on, wherein the user has to follow a specific order to touch the sensing position, and the password can contain identical characters. In one embodiment, the password PSWD may be a non-ordered combination 2, 3, 4, 5, 7, 8", wherein the user has to simultaneously touch the sensing positions corresponding to the password PSWD "2, 3, 4, 5, 7, 8", and the password cannot contain identical characters. In addition, when the password PSWD contains more than five characters, the user may use two hands to input the password PSWD.

In short, the password power switch circuit 10 of the present invention utilizes the thermal energy conversion circuit 100 as the password input interface, and when the input password is correct, the thermal energy sensed by the thermal energy conversion circuit 100 is used to perform thermal energy conversion to drive the password power switch circuit 10. As a result, different from the traditional power source switch circuit using battery or external power source as electricity power and without password protection function, the password power switch circuit 10 of the present invention utilizes thermal energy conversion as the electricity power and has the password protection function.

In practice, the password power switch circuit 10 may perform password protection function before the electronic device 1 is boot or has entered the operating system, which protects the electronic device 1 and user information (password) from hacked by other person through the operating system. Or, when electronic device 1 is stolen, a thief cannot shut down the electronic device 1 by combination buttons, so a position tracking function of the electronic device 1 cannot be turned off, which is benefit for searching the stolen electronic device 1.

Figure 2:
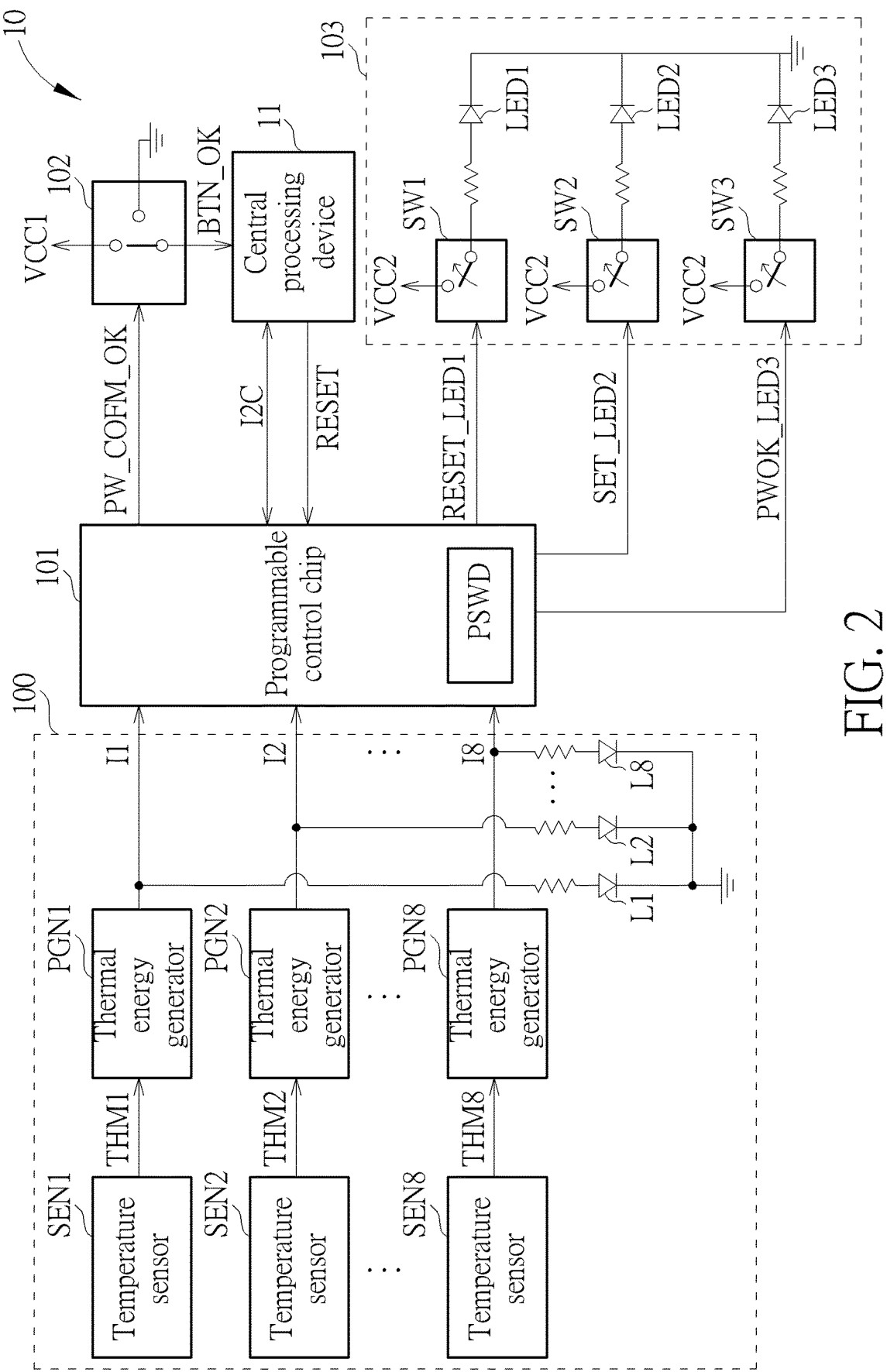
FIG. 2 is a schematic diagram of a password power switch circuit according to an embodiment of the present invention.

FIG. 2 is a schematic diagram of a password power switch circuit 10 according to an embodiment of the present invention. The password power switch circuit 10 includes a thermal energy conversion circuit 100, a programmable control chip 101, a switch circuit 102, and an indication circuit 103. The thermal energy conversion circuit 100 includes a plurality of temperature sensors SEN1-SEN8, a plurality of thermal energy generators PGN1-PGN8 and a plurality of indication lights L1-L8. In one embodiment, numbers of the temperature sensors and corresponding thermal energy generators are arbitrary integers.

The temperature sensors SEN1-SEN8 are respectively coupled to the thermal energy generators PGN1-PGN8, and used for sensing temperature or thermal energy (e.g., body temperature and emitted thermal energy of the user) to generate the sensing temperatures THM1-THM8 to the thermal energy generators PGN1-PGN8.

The thermal energy generators PGN1-PGN8 are respectively coupled to the indication lights L1-L8 and the programmable control chip 101, and used for performing thermal energy conversion according to the sensing temperatures THM1-THM8 to generate a plurality of drive currents I1-I8 to the indication light L1-L8 and the programmable control chip 101. The drive currents I1-I8 can turn on the indication lights L1-L8, when the indication lights L1-L8 are turned on, which means that the thermal energy conversion circuit 100 has sensed enough thermal energy to make the thermal energy generator PGN1-PGN8 generating the enough drive currents I1-I8.

The programmable control chip 101 is coupled to the thermal energy generators PGN1-PGN8, the switch circuit 102, the central processing device 11 and the indication circuit 103, and used for generating a power signal PW_COFM_OK to the switch circuit 102 according to the drive currents I1-I8 and the password PSWD. The switch circuit 102 is coupled to the programmable control chip 101, the central processing device 11 and a power source VCC1, and used for generating the power-on signal BTN_OK to the central processing device 11 according to the power signal PW_COFM_OK, and then the central processing device 11 performs operations according to the power signal PW_COFM_OK.

When the programmable control chip 101 determines that the input password is same as the password PSWD, the power signal PW_COFM_OK with high voltage level is generated to the switch circuit 102, and the switch circuit 102 is connected to the ground to generate the power-on signal BTN_OK with low voltage level to the central processing device 11 to indicate that the password power switch circuit 10 has been driven. On the other hand, when the programmable control chip 101 determines that the input password is different from the password PSWD, the power signal PW_COFM_OK is not generated to the switch circuit 102, and the switch circuit 102 is connected to the power source VCC1 to keep the power-on signal BTN_OK with high voltage level to indicate that the password power switch circuit 10 is not driven.

When the user firstly uses the electronic device 1, the programmable control chip 101 further generates the reset signal RESET_LED1, the set signal SET_LED2 and the confirm signal PWOK_LED3 to the indication circuit 103 according to the drive currents I1-I8, wherein the reset signal RESET_LED1 indicates a resetting password operation, the set signal SET_LED2 indicates an input password operation, and the confirm signal PWOK_LED3 indicates a confirming password operation.

The indication circuit 103 is coupled to the programmable control chip 101 and a power source VCC2, and includes switches SW1, SW2 and SW3, and indication lights LED1, LED2 and LED3. The indication circuit 103 respectively connects the power source VCC2 with the indication lights LED1, LED2 and LED3 according to the reset signal RESET_LED1, the set signal SET_LED2 and the confirm signal PWOK_LED3. The programmable control chip 101 is performing the resetting password operation when the indication light LED1 is turned on. The programmable control chip 101 is performing the input password operation when the indication light LED2 is turned. The programmable control chip 101 is performing the confirming password operation when indication light LED3 is turned on.

Regarding the resetting password operation, the user may touch all the temperature sensors SEN1-SEN8 when firstly using the electronic device 1, the thermal energy generators PGN1-PGN8 generates a plurality of drive currents (about milliampere) through thermal energy conversion to turn on all the indication lights L1-L8 corresponding to the temperature sensors SEN1-SEN8, so as to notify the user that the temperature sensors SEN1-SEN8 have sensed enough thermal energy. Meanwhile, the programmable control chip 101 generates the reset signal RESET_LED1 to turn on the indication light LED1 to indicate that the programmable control chip 101 is performing the resetting password operation.

Then, the user may touch at least one of the temperature sensors SEN1-SEN8 to input the password PSWD. For example, the user may put fingers on the positions where the temperature sensors are located until the corresponding indication lights L1-L8 are turned on. Then, the programmable control chip 101 generates the set signal SET_LED2 to turn on the indication light LED2 to indicate that the programmable control chip 101 has performed the input password operation successfully.

Finally, the user may touch the at least one of the temperature sensors SEN1-SEN8 to input the password PSWD again until the corresponding indication lights L1-L8 are turned on. Then, programmable control chip 101 generates the confirm signal PWOK_LED3 to turn on the indication light LED3 to indicate that programmable control chip 101 has performed the confirming password operation successfully. Meanwhile, the programmable control chip 101 generates the power signal PW_COFM_OK to the switch circuit 102, and the switch circuit 102 generates the power-on signal BTN_OK to the central processing device 11 according to power signal PW_COFM_OK to instruct the central processing device 11 to perform the following operation.

If the user wants to change the password, the electronic device 1 may perform the resetting password operation after entering the operating system. In detail, the user may execute the resetting password operation in a system configuration selection menu to input the old password through the password power switch circuit, and then the central processing device 11 generates a reset control signal RESET to the programmable control chip 101 to perform the resetting password operation. For example, the user may input a new password twice, and then the central processing device 11 resets the programmable control chip 101 (e.g., reset the password PSWD stored in the programmable control chip 101) through the control signal I2C to finish the password change operation.

Therefore, the password power switch circuit 10 can perform setting and resetting (change) password, to increase flexibility of the password protection function.

Figure 3:
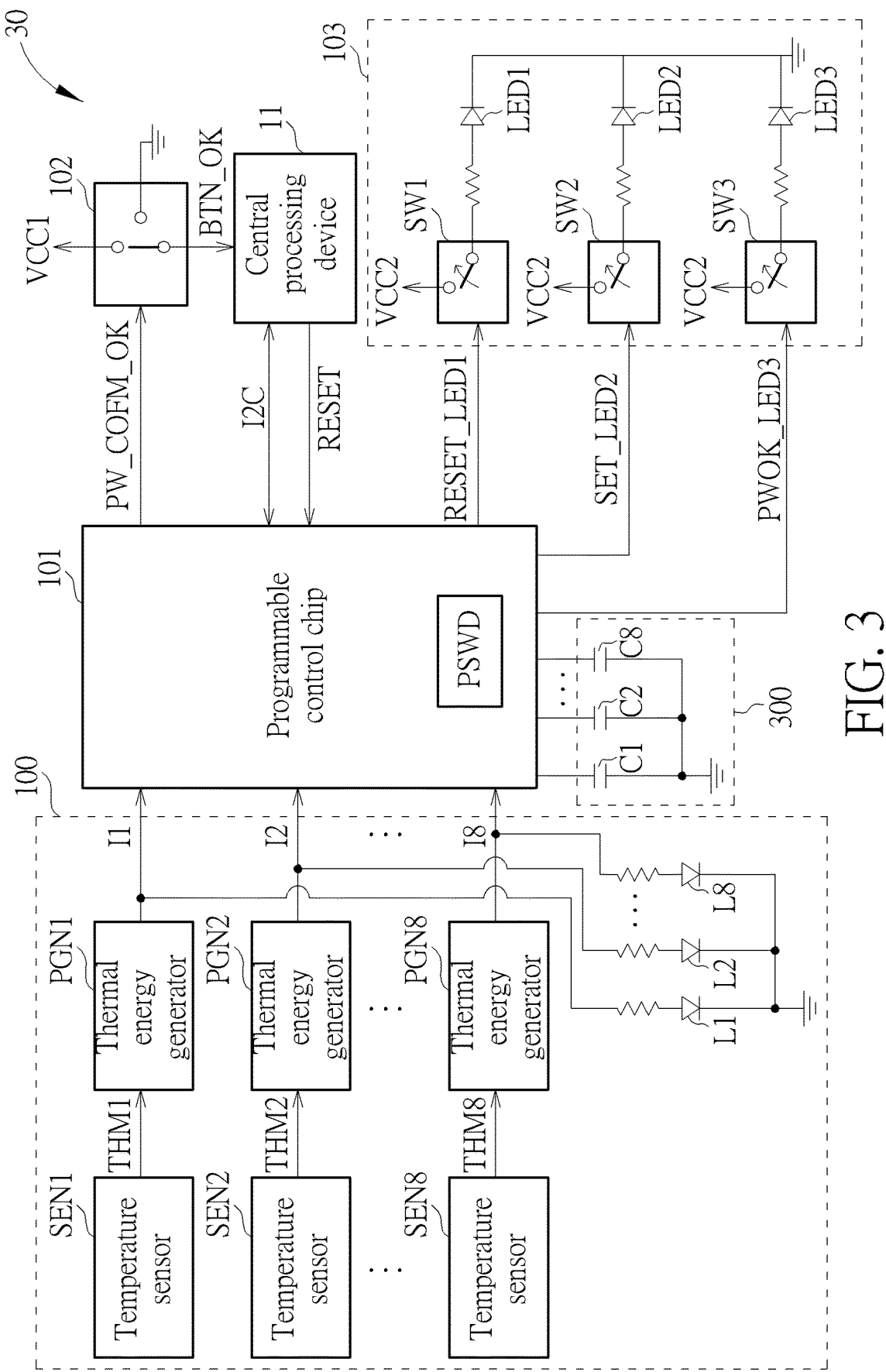
FIG. 3 is a schematic diagram of a password power switch circuit according to another embodiment of the present invention.

FIG. 3 is a schematic diagram of a password power switch circuit 30 according to another embodiment of the present invention. The password power switch circuit 30 further includes a power storage circuit 300, and the power storage circuit 300 includes a plurality of capacitors C1-C8. The plurality of capacitors C1-C8 is coupled to the programmable control chip 101, and respectively corresponding to the plurality of thermal energy generators PGN1-PGN8. When the thermal energy generators PGN1-PGN8 generate driving currents, the capacitors C1-C8 are charged by the driving currents to store charges (or voltage) in the capacitors C1-C8.

Capacitances of the capacitor C1-C8 are associated with the driving electricity power required for the password power switch circuit 30 and the indication lights L1-L8, which means that one of the capacitors C1-C8 has to store enough voltage to drive the password power switch circuit 30 and turn on the indication lights L1-L8. By this way, it can be ensured that each of the temperature sensors SEN1-SEN8 can sense enough thermal energy to perform thermal energy conversion, and the user can be noticed by the indication light L1-L8 to know whether the touching is successful as well.

When the fingers of the user have left the temperature sensors SEN1-SEN8 or there is no sensing temperature THM1-THM8 generated, the programmable control chip 101 discharges each of the capacitors C1-C8 to wipe out all the stored charges, which ensures the sensitivity of the temperature sensors SEN1-SEN8.

Figure 4:
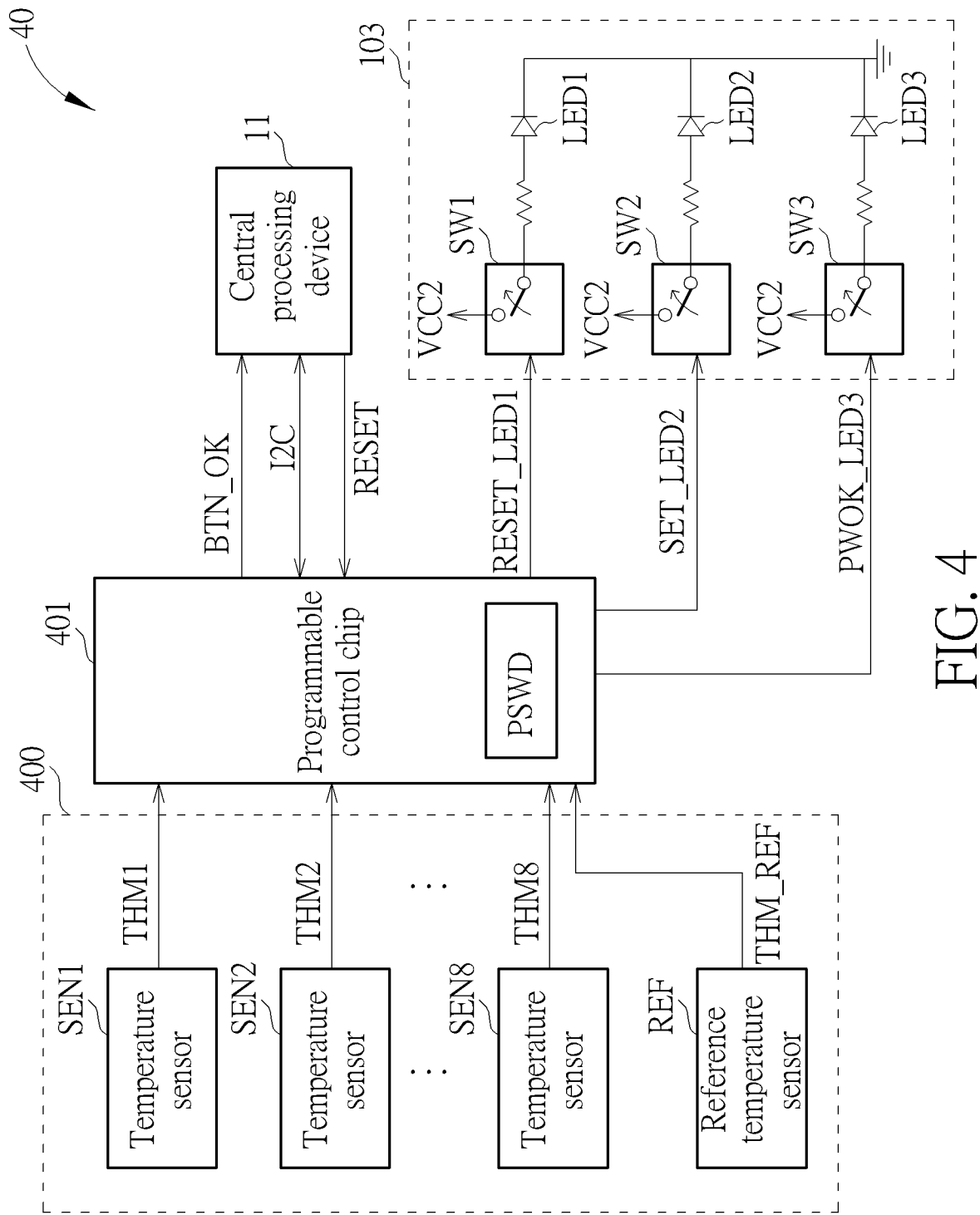
FIG. 4 is a schematic diagram of a password power switch circuit according to another embodiment of the present invention.

FIG. 4 is a schematic diagram of a password power switch circuit 40 according to another embodiment of the present invention. The password power switch circuit 40 includes a thermal energy conversion circuit 400, a programmable control chip 401, and the indication circuit 103. The thermal energy conversion circuit 400 includes a plurality of temperature sensors SEN1-SEN8 and a reference temperature sensor REF.

The temperature sensors SEN1-SEN8 are coupled to the programmable control chip 401, and used for sensing temperature or thermal energy (e.g., body temperature and emitted thermal energy of the user) to generate the sensing temperatures THM1-THM8 to the programmable control chip 401. The reference temperature sensor REF is coupled to the programmable control chip 401, and used for sensing a reference temperature THM_REF or a reference thermal energy (e.g., room temperature and corresponding thermal energy). The programmable control chip 401 is used for generating a power-on signal BTN_OK to the central processing device 11 according to the sensing temperatures THM1-THM8 and the reference temperature THM_REF, and then the central processing device 11 performs operations according to the power-on signal BTN_OK.

In detail, when differences between the sensing temperatures THM1-THM8 and the reference temperature THM_REF are greater than a threshold, the thermal energy corresponding to the difference between the body temperature and the room temperature may be converted into electricity power to drive the password power switch circuit 40. The programmable control chip 40 further compares the sensing positions corresponding to the sensing temperatures THM1-THM8 and the positions corresponding to the password PSWD to generate the power-on signal BTN_OK to the central processing device 11.

When the programmable control chip 401 determines that the input password is same as the password PSWD, the power-on signal BTN_OK with low voltage level is generated to the central processing device 11 to indicate that the password power switch circuit 40 has been driven. On the other hand, when the programmable control chip 401 determines that the input password is different from the password PSWD, the power-on signal BTN_OK with low voltage level is not generated to the central processing device 11 to indicate that the password power switch circuit 40 has not been driven. As a result, the central processing device 11 determines whether to perform operations (such as system boot, turn on screen, turn off screen or display selections regarding system shut down and reboot can be performed) according to the power-on signal BTN_OK. In other embodiments of the present invention, the above mentioned operations further include turning on sensors or camera of the electronic device 1, performing applications, or authentications of website log-in and registration.

Figure 5:
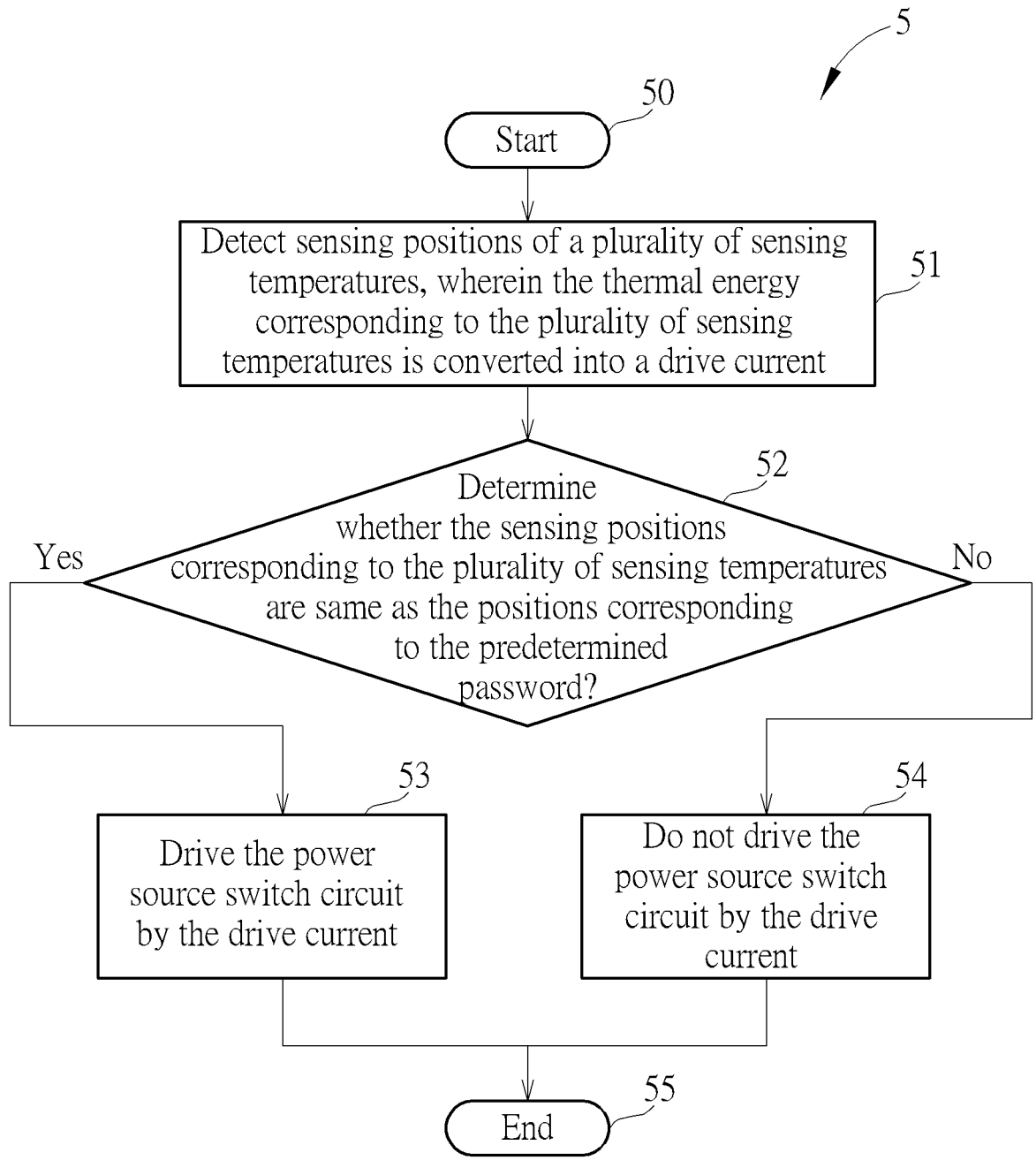
FIG. 5 is a flowchart of a process of activating password power switch circuit according to an embodiment of the present invention.

Operations regarding the password power switch circuits 10, 30 and 40 may be summarized into a process 5 of driving the password power switch circuit, as shown in FIG. 5. The process 5 may be compiled into a program code and stored in the programmable control chip 101, and includes the following steps.

Step 50: Start.

Step 51: Detect sensing positions of a plurality of sensing temperatures, wherein the thermal energy corresponding to the plurality of sensing temperatures is converted into a drive current.

Step 52: Determine whether the sensing positions corresponding to the plurality of sensing temperatures are same as the positions corresponding to the predetermined password? Go to Step 53 if yes; go to Step 54 if no.

Step 53: Drive the power source switch circuit by the drive current. End.

Step 54: Do not drive the power source switch circuit by the drive current.

Step 55: End.

Detailed operations regarding the process 5 may be obtained by referring to descriptions of FIG. 2 to FIG. 4, which is omitted.

Figure 6:
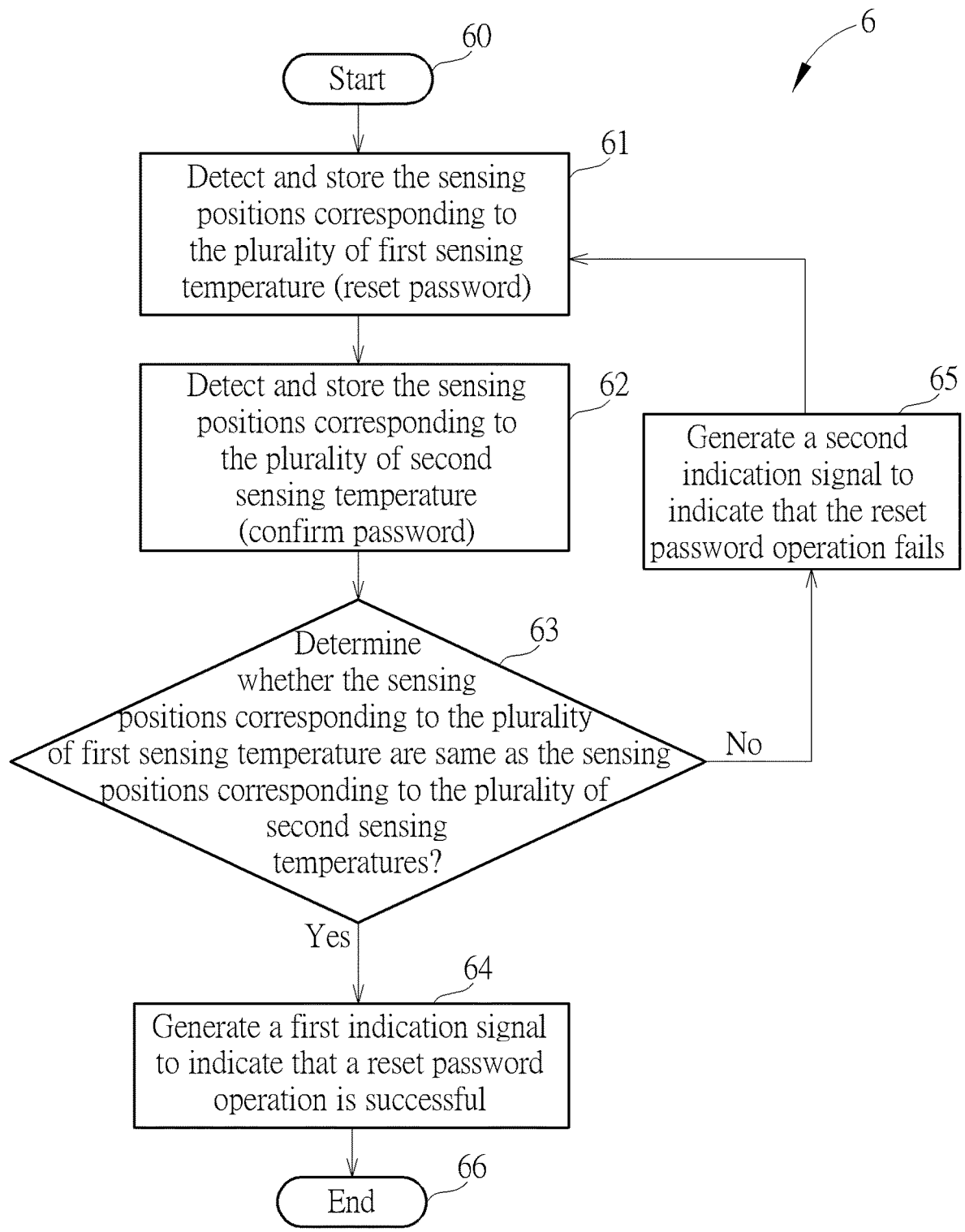
FIG. 6 is a flowchart of a process of resetting password according to an embodiment of the present invention.

Operations regarding the password power switch circuits 10, 30 and 40 may be summarized into a process 6 of resetting password, as shown in FIG. 6. The process 6 may be compiled into a program code and stored in the programmable control chip 101, and includes the following steps.

Step 60: Start.

Step 61: Detect and store the sensing positions corresponding to the plurality of first sensing temperature (reset password).

Step 62: Detect and store the sensing positions corresponding to the plurality of second sensing temperature (confirm password).

Step 63: Determine whether the sensing positions corresponding to the plurality of first sensing temperature are same as the sensing positions corresponding to the plurality of second sensing temperatures? Go to Step 64 if yes; go to Step 65 if no.

Step 64: Generate a first indication signal to indicate that a reset password operation is successful.

Step 65: Generate a second indication signal to indicate that the reset password operation fails. Return to Step 61.

Step 66: End.

Detailed operations regarding the process 6 may be obtained by referring to descriptions of FIG. 2 to FIG. 4, which is omitted.

To sum up, the password power switch circuit of the present invention utilizes the thermal energy conversion circuit as the password input interface, and when the input password is correct, the thermal energy sensed by the thermal energy conversion circuit is used to perform thermal energy conversion to drive the password power switch circuit. As a result, different from the traditional power source switch circuit using battery or external power source as electricity power and without password protection function, the password power switch circuit of the present invention utilizes thermal energy conversion as the electricity power and has the password protection function.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A password power switch circuit for an electronic device, comprising:
   a thermal energy conversion circuit configured to generate a plurality of sensing temperatures; and
   a programmable control chip coupled to the thermal energy conversion circuit, and configured to store a password and generate a power-on signal to a central processing device of the electronic device according to sensing positions corresponding to the plurality of sensing temperatures and positions corresponding to the password, wherein the central processing device determines an operation associated with the electronic device according to the power-on signal.

2. The password power switch circuit of claim 1, wherein the thermal energy conversion circuit comprises:
   a plurality of temperature sensors configured to generate the plurality of sensing temperatures;
   a plurality of thermal energy generators coupled to the plurality of temperature sensor, and configured to generate a plurality of drive currents to the programmable control chip according to the plurality of sensing temperatures; and
   a plurality of indication lights coupled to the plurality of thermal energy generators, wherein the plurality of drive currents respectively drives the plurality of indication lights.

3. The password power switch circuit of claim 2, wherein the programmable control chip is configured to generate a power signal, a reset signal, a set signal and a confirm signal according to the sensing positions corresponding to the plurality of sensing temperatures and the positions corresponding to the password, and the password power switch circuit further comprises:
   a switch circuit coupled to the programmable control chip, and configured to generate the power-on signal to the central processing device according to the power signal; and
   an indication circuit coupled to the programmable control chip, and comprising:
      a first switch configured to turn on a first indication light according to the reset signal;
      a second switch configured to turn on a second indication light according to the set signal; and
      a third switch configured to turn on a third indication light according to the confirm signal.

4. The password power switch circuit of claim 3, wherein the reset signal indicates a resetting password operation, the programmable control chip is performing the resetting password operation when the first indication light is turned on; the set signal indicates an input password operation, the programmable control chip is performing the input password operation when the second indication light is turned on; and the confirm signal indicates a confirming password operation, the programmable control chip is performing the confirming password operation when the third indication light is turned on.

5. The password power switch circuit of claim 4, wherein the central processing device is configured to generate a reset control signal to programmable control chip to instruct the programmable control chip to perform a resetting password process, wherein the resetting password process comprises the resetting password operation, the input password operation and the confirming password operation.

6. The password power switch circuit of claim 3, wherein the sensing positions corresponding to the plurality of sensing temperatures correspond to an input password;
wherein the programmable control chip generates the power signal with a high voltage level to the switch circuit when the programmable control chip determines that the input password is same as the password, so as to the switch circuit is connected to ground to generate the power-on signal with a low voltage level to the central processing device to indicate that the password power switch circuit has been driven; and
wherein the programmable control chip does not generate the power signal to the switch circuit when the programmable control chip determines that the input password is different from the password, so as to the switch circuit is connected a power source to keep the power-on signal with a high voltage level to indicate that the password power switch circuit is not driven.

7. The password power switch circuit of claim 2, further comprising a power storage circuit, wherein the power storage circuit comprises:
a plurality of capacitors coupled to the programmable control chip, wherein the plurality of drive currents respectively charges the plurality of capacitor to store charges in the plurality of capacitors.

8. The password power switch circuit of claim 7, wherein the programmable control chip discharges the plurality of capacitors when the plurality of temperature sensors does not generate the plurality of sensing temperature.

9. The password power switch circuit of claim 1, wherein the thermal energy conversion circuit comprises:
a plurality of temperature sensor coupled to the programmable control chip, and configured to generate the plurality of sensing temperatures to the programmable control chip; and
a reference temperature sensor coupled to the programmable control chip, and configured to generate a reference temperature to the programmable control chip, wherein the programmable control chip generates the power-on signal to the central processing device according to the plurality of sensing temperatures and the reference temperature.

10. The password power switch circuit of claim 9, wherein the programmable control chip is further configured to generate a power signal and a reset signal, a set signal and a confirm signal according to the sensing positions corresponding to the plurality of sensing temperatures and the sensing positions corresponding to the password, and the password power switch circuit further comprises:
an indication circuit coupled to the programmable control chip, and comprising:
a first switch configured to turn on a first indication light according to the reset signal;
a second switch configured to turn on a second indication light according to the set signal; and
a third switch configured to turn on a third indication light according to the confirm signal.

11. The password power switch circuit of claim 10, wherein the reset signal indicates a resetting password operation, the programmable control chip is performing the resetting password operation when the first indication light is turned on; the set signal indicates an input password operation, the programmable control chip is performing the input password operation when the second indication light is turned on; and the confirm signal indicates a confirming password operation, the programmable control chip is performing the confirming password operation when the third indication light is turned on.

12. The password power switch circuit of claim 11, wherein the central processing device is configured to generate a reset control signal to programmable control chip to instruct the programmable control chip to perform a resetting password process, wherein the resetting password process comprises the resetting password operation, the input password operation and the confirming password operation.

13. The password power switch circuit of claim 10, wherein the sensing positions corresponding to the plurality of sensing temperatures correspond to an input password;
wherein the programmable control chip generates the power-on signal with a low voltage level to the central processing device when the programmable control chip determines that the input password is same as the password, to indicate that the password power switch circuit has been driven; and
wherein the programmable control chip keeps the power-on signal with a high voltage level when the programmable control chip determines that the input password is different from the password to indicate that the password power switch circuit is not driven.

14. An electronic device, comprising:
a password power switch circuit, comprising:
a thermal energy conversion circuit configured to generate plurality of sensing temperature; and
a programmable control chip coupled to the thermal energy conversion circuit, and configured to store a password and a power-on signal according to sensing positions corresponding to the plurality of sensing temperature and sensing positions corresponding to the password; and
a central processing device coupled to the password power switch circuit, and configured to determine an operation associated with the electronic device according to the power-on signal.

15. The electronic device of claim 14, wherein the thermal energy conversion circuit comprises:
a plurality of temperature sensors configured to generate the plurality of sensing temperatures;
a plurality of thermal energy generators coupled to the plurality of temperature sensor, and configured to generate a plurality of drive currents to the programmable control chip according to the plurality of sensing temperatures; and
a plurality of indication lights coupled to the plurality of thermal energy generators, wherein the plurality of drive currents respectively drives the plurality of indication lights.

16. The electronic device of claim 15, wherein the programmable control chip is further configured to generate a power signal and a reset signal, a set signal and a confirm signal according to the sensing positions corresponding to the plurality of sensing temperatures and the sensing positions corresponding to the password, and the password power switch circuit further comprises:
- an indication circuit coupled to the programmable control chip, and comprising:
- a first switch configured to turn on a first indication light according to the reset signal;
- a second switch configured to turn on a second indication light according to the set signal; and
- a third switch configured to turn on a third indication light according to the confirm signal.

17. The electronic device of claim 16, wherein the reset signal indicates a resetting password operation, the programmable control chip is performing the resetting password operation when the first indication light is turned on; the set signal indicates an input password operation, the programmable control chip is performing the input password operation when the second indication light is turned on; and the confirm signal indicates a confirming password operation, the programmable control chip is performing the confirming password operation when the third indication light is turned on.

18. The electronic device of claim 17, wherein the central processing device is configured to generate a reset control signal to programmable control chip to instruct the programmable control chip to perform a resetting password process, wherein the resetting password process comprises the resetting password operation, the input password operation and the confirming password operation.

19. The electronic device of claim 16, wherein the sensing positions corresponding to the plurality of sensing temperatures correspond to an input password, the programmable control chip generates the power signal with a high voltage level to the switch circuit when the programmable control chip determines that the input password is same as the password, the switch circuit is connected to a ground to generate the power-on signal with a low voltage level to the central processing device to indicate that the password power switch circuit has been driven; the programmable control chip does not generate the power signal to the switch circuit when the programmable control chip determines that the input password is different from the password, the switch circuit is connected a power source to keep the power-on signal with a high voltage level to indicate that the password power switch circuit is not driven.

20. The electronic device of claim 15, wherein the password power switch circuit further comprises a power storage circuit, and the power storage circuit comprises:
- a plurality of capacitors coupled to the programmable control chip, wherein the plurality of drive currents respectively charges the plurality of capacitor to store charges in the plurality of capacitors, wherein the programmable control chip discharges the plurality of capacitors when the plurality of temperature sensors does not generate the plurality of sensing temperature.

\* \* \* \* \*